March 16, 1954  G. E. BJORKLUND  2,672,548
ELECTRIC HEATING OVEN
Filed Sept. 20, 1949
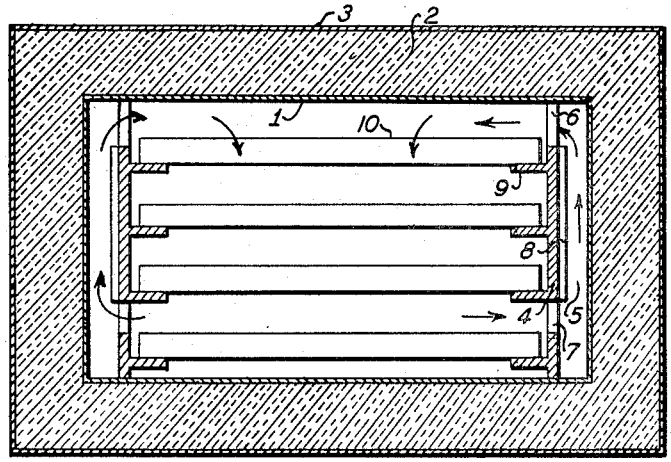
INVENTOR
GUSTAF ERIK BJORKLUND
BY  *Jarvis C. Marble*
ATTORNEY Patented Mar. 16, 1954

2,672,548

UNITED STATES PATENT OFFICE 2,672,548

ELECTRIC HEATING OVEN

Gustaf Erik Björklund, Stockholm, Sweden

Application September 20, 1949, Serial No. 116,691

Claims priority, application Sweden
September 21, 1948

1 Claim. (Cl. 219—35)

This invention relates to electric heating ovens preferably for sterilizing instruments. The known ovens of this kind usually consists of an oven chamber, the top, bottom and side walls of which are in contact with electric heating elements at the outer sides, and which is provided with an outside heat insulation which is in direct contact with the heating elements. On the inner sides of the side walls a number of ledges with angular cross section are arranged which support trays on which the objects to be sterilized are laid.

The heat from the heating elements is primarily delivered to the walls of the oven chamber and from there to the air in the oven, the air in its turn heating the trays and the objects lying thereon. In addition heat transmission to the trays also takes place through radiation from the walls of the oven chamber and above all through conduction through the ledges. In order to attain satisfactory heat transmission to the oven contents and a temperature distribution in the oven chamber tolerably even by this construction the walls of the oven chamber must be made of relatively thick plates of a material having high thermal conductivity. Therefore, the oven has a relatively large metal mass which must be heated every time the oven is to be used, the heating operation therefore taking a long time. On that account, a considerable quantity of the heat supplied is consumed for the heating of the oven only, and besides, the heat losses through heat transmission outwardly are increased as the length of the heating period increases. Also on continuous operation the heat losses will be large, as the heating elements which are directly covered by the insulation at the outer side will attain a high temperature, a large quantity of heat therefore being conducted away through the insulation lying at the outside of the heating elements.

Through the present invention a considerable reduction of these losses is made possible, so that a larger portion of the heat supplied can be used for heating the objects. On that account these will be quickly heated to the desired sterilizing temperature, valuable time being saved and oxidation of steel instruments being decreased thereby. Also quicker heating of the oven to the operating temperature and a more even temperature distribution is obtained. To this must be added that the oven chamber can be made of thin sheet material without any inconvenience and therefore be less expensive in manufacture.

The above advantages are principally arrived at by placing one or more heat conductors in the oven chamber at a distance from the side walls of the oven, so that between the heat conductor and the adjacent side wall an intermediate space is formed which is in open communication with the oven chamber, said heat conductor being made of a material having high thermal conductivity and great thickness, and a heating element being arranged in close contact with the surface of the heat conductor facing the adjacent side wall.

In the following portion of this specification the invention will be described more in detail with reference to the accompanying drawing which shows in vertical cross section a form of heating oven embodying the invention.

In the drawing the walls of the oven chamber are indicated by 1, and the insulation surrounding the oven chamber by 2, the insulation in its turn being surrounded by an outer cover 3. At a distance from each side wall of the oven chamber a heat conductor in the form of an inner wall 4 which is substantially parallel to the side wall is arranged in such a way that an intermediate space 5 is formed between the side wall and the inner wall. The inner walls 4 rest on the bottom of the oven chamber and are provided with openings 6 and 7 at the top and bottom respectively through which the intermediate spaces 5 are in open communication with the rest of the oven chamber. The walls 4 are also provided with electric heating elements 8 on the sides facing the side walls and with ledges 9 on the opposite sides. Trays 10 inserted in the oven chamber rest on these ledges. The heating elements 8 take up a part only of the spaces 5, these remaining principally as vertically extending channels. The air in these channels is highly heated by the contact with the heating elements and therefore tends to ascend. Consequently the air will escape from the upper portion of the channel through the openings 6 to the oven chamber, sweep over the trays 10 and the objects lying thereon and then enter the channels again through the openings 7 in the lower portion of the inner walls. Thus, the air will circulate in the oven in closed circuits, thereby transmitting heat from the heating elements to the objects lying on the trays. The inner walls 4 are made of a material having high thermal conductivity and have relatively great thickness, by this means being conducive to distribution of the heat produced in the heating elements. The ledges 9 are made as integral portions of the inner walls 4, their capability of conducting heat directly to the trays being increased thereby.

In addition to the heat conduction through the inner walls 4, an effective heat transmission from the heating elements to the heated objects is attained on account of the air circulation, so that the objects will be quickly heated to the desired temperature. An equalization of the temperatures in the oven is also arrived at, so that the temperature of the side walls opposite the heating elements will not appreciably exceed the temperature of the oven chamber, the heat losses through conduction therefore being as low as possible.

The walls of the oven chamber, not being active in the heat transmission to a degree worth mentioning, can be made of any optional thin sheet material, by means of which both a less expensive construction and small heat absorbing capacity of the oven is obtained, so that the latter will quickly arrive at operating temperature. On account of the strong cooling effect of the inner walls 4 and the circulating air on the heating elements, these will work at low temperature, their life thus being increased. Finally the objects on the trays will be heated very nearly uniformly all over the trays due to the strong air circulation and the conduction in the trays.

The embodiment described and shown in the drawing should only be considered as an example. Within the limits of the claim, the construction may be varied in different ways. By way of example, one heating element only may be used which is arranged on an inner wall located near one side wall of the oven chamber.

What I claim is:

In an electric heating oven, a wall structure providing an oven space and including an externally insulated side wall having a lining of thin sheet material, a substantially vertically arranged heat absorbing and conducting plate-like element spaced from said side wall to provide a vertically extending channel between said oven space and the lining of said side wall, said element comprising material having high thermal conductivity and having a thickness several times that of said lining and being provided with integral horizontally disposed spaced ledges for supporting and conducting heat to objects in said oven space, electrically energized heating means located in said channel, said heating means being in direct heat conducting intimate contact with said plate-like element and spaced from said side wall a substantial distance, said element and said heating means on the one hand and the lining of the side wall on the other hand being substantially isolated from each other with respect to conduction of heat therebetween, while the heat conduction between said heating means and said element is substantially the same as in an integral structure and apertures placing said channel and said oven space in substantially open communication at vertically spaced places to provide for free thermal circulation of air in a closed circuit upwardly through said channel and downwardly through said oven space over said objects.

GUSTAF ERIK BJÖRKLUND.

References Cited in the file of this patent

UNITED STATES PATENTS

| Number | Name | Date |
|---|---|---|
| 1,218,341 | Truitt | Mar. 6, 1917 |
| 1,986,088 | Wild | Jan. 1, 1935 |
| 2,490,076 | Maxson | Dec. 6, 1949 |
| 2,491,420 | Scott | Dec. 13, 1949 |
| 2,494,022 | Weintrob et al. | Jan. 10, 1950 |

FOREIGN PATENTS

| Number | Country | Date |
|---|---|---|
| 21,468 | Great Britain | Sept. 15, 1910 |
| 22,402 | Great Britain | Oct. 4, 1913 |
| 23,218 | Great Britain | Oct. 14, 1914 |
| 592,986 | Great Britain | Oct. 6, 1947 |